Figure 1:
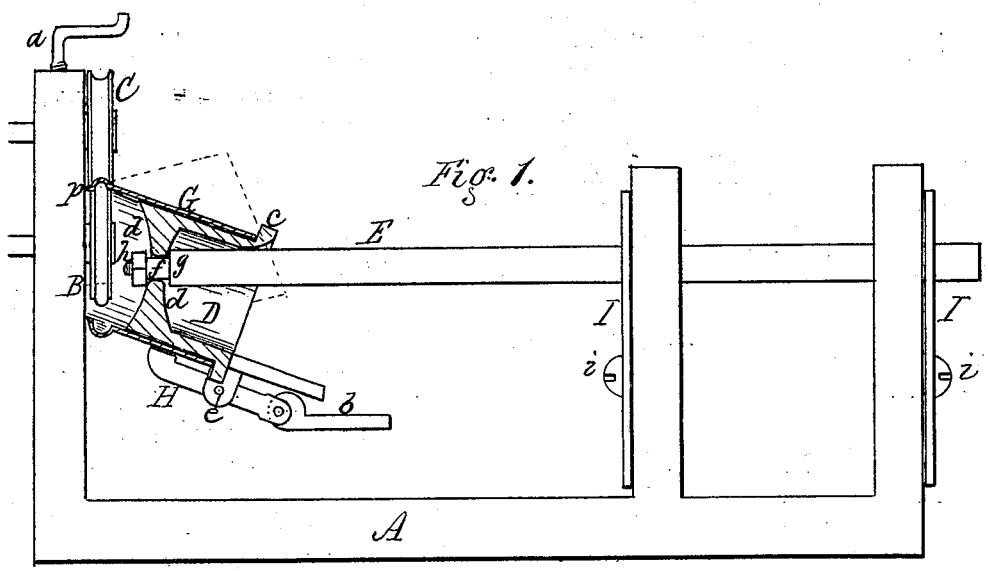
Figure 2:
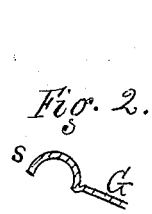
Figure 3:
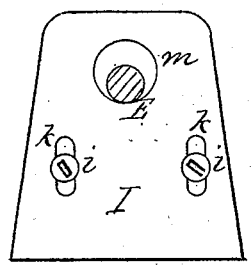

H. B. MORRISON.
Machines for Forming Sheet-Metal Pipe-Elbows.

No. 142,929. Patented September 16, 1873.

Witnesses.
Alfred Padley
Henry M. Thomas

Inventor.
Hiram B. Morrison
p. R. F. Osgood,
atty.

AM. PHOTO-LITHOGRAPHIC CO. N.Y. (OSBORNE'S PROCESS)

UNITED STATES PATENT OFFICE.

HIRAM B. MORRISON, OF LE ROY, ASSIGNOR TO SARGENT & GREENLEAF, OF ROCHESTER, NEW YORK.

IMPROVEMENT IN MACHINES FOR FORMING SHEET-METAL-PIPE ELBOWS.

Specification forming part of Letters Patent No. 142,929, dated September 16, 1873; application filed May 21, 1873.

*To all whom it may concern:*

Be it known that I, HIRAM B. MORRISON, of Le Roy, in the county of Genesee and State of New York, have invented a certain new and useful Improvement in Apparatus for Beading Sheet-Metal Pipes, and for other purposes; and I do hereby declare that the following is a full, clear, and exact description of the construction and operation of the same.

This apparatus is intended more particularly for rolling the beads to form the joints of angular or elbow pipe. The edges of the metal run between rollers, and the difficulty lies in keeping the angular edge in a plane with the rollers. To accomplish this, I mount the head or mandrel which holds the pipe upon a shaft, and connect them by a universal joint, which allows a free vibration to the head in adapting itself to position.

In the drawings, A represents a frame, of any convenient construction; and B C are the rollers, one convex and the other concave, for rolling the bead. These rollers are made to separate for the insertion of the material, and are then closed again. This is accomplished by a screw, *a*, or by any convenient means. D is the revolving head or mandrel, and E is the shaft upon which it is mounted. The head is of cylindrical form to receive the pipe G, which is wrapped around the same, and clamped by an eccentric jaw, H, pivoted at *e* and tightened by a lever-cam, *b*. The head is also provided with a flange, *c*, which aids to retain the pipe in place.

The connection between the head and the shaft is as follows: *d* is a web formed inside the head, in which is made a hole centered from the face of the front edge of the pipe, which passes between the rollers. This eye or hole slips upon a bearing, *f*, of the shaft, having a shoulder, *g*, in the rear. A nut, *h*, screws up on the threaded end of the shaft against another shoulder, thus securing the web between the nut and the shoulder *g*, but with sufficient space for loose play and vibration, acting as a universal joint. The head may either turn loosely around the bearing *f* or the swivel-joint may be such that the shaft will revolve with the head. The shaft, at the rear, is connected with a lever or other device by which it may be pushed up or drawn back to bring the pipe to the rollers or remove it from the same. The shaft is also mounted in bearing-plates I I, which are adjustable higher or lower by means of set-screws *i i* and slots *k k*. The inner plate is also provided with a large hole, *m*, through which the shaft passes, and has a suitable play at any adjustment.

The operation is as follows: The metal being cut of proper form, wrapped around the head, and clamped, as before described, the shaft is moved up so as to bring the projecting edge of the metal between the rollers, said edge resting square against the face-plate *p*, which forms a guide. The rollers are then closed and revolved, and the contact gives motion to the metal, and consequently to the head. As the metal revolves its angular edge will rest against the face-plate, and the head or mandrel will turn or vibrate upon the bearing *f*, assuming different positions as it goes around, but always adapting itself to such a position as will present the edge properly to the rollers. By this means the head *s* is turned upon the angular end or edge of the pipe without difficulty and turned true. Beads of this kind have heretofore been formed by guiding the metal by hand. A different arrangement of the connection between the head and shaft might be made and still the same result be attained. I do not wish to confine myself to the shoulder *g* and nut *h*.

Having thus described my invention, what I claim as new, and desire to secure by Letters Patent, is—

The combination of the head D and shaft E, when connected by a joint, which allows vibration of the head to adapt itself to position for the passage of the angular edge of the pipe between the rollers, as herein described.

In witness whereof I have hereunto signed my name in the presence of two subscribing witnesses.

H. B. MORRISON.

Witnesses:
R. F. OSGOOD,
HENRY M. THOMAS.